No. 723,923. PATENTED MAR. 31, 1903.
E. E. RITCHIE.
VOTING MACHINE.
APPLICATION FILED JULY 5, 1902.
NO MODEL. 10 SHEETS—SHEET 1.

Witnesses.
H. D. Kilgore,
A. H. Opsahl

Inventor.
Enoch E. Ritchie
By his Attorneys.
Williamson Merchant

No. 723,923. PATENTED MAR. 31, 1903.
E. E. RITCHIE.
VOTING MACHINE.
APPLICATION FILED JULY 5, 1902.
NO MODEL. 10 SHEETS—SHEET 4.

Witnesses.
H. D. Kilgore
A. U. Opsahl

Inventor
Enoch E. Ritchie,
By his Attorneys,
Williamson & Merchant

No. 723,923. PATENTED MAR. 31, 1903.
E. E. RITCHIE.
VOTING MACHINE.
APPLICATION FILED JULY 5, 1902.
NO MODEL. 10 SHEETS—SHEET 5.

Witnesses.
H. D. Kilgore.
A. H. Opsahl.

Inventor.
Enoch E. Ritchie,
By his Attorneys,
Williamson Merchant

No. 723,923. PATENTED MAR. 31, 1903.
E. E. RITCHIE.
VOTING MACHINE.
APPLICATION FILED JULY 5, 1902.
NO MODEL. 10 SHEETS—SHEET 7.

Witnesses,
K. D. Kilgore
A. H. Opsahl

Inventor:
Enoch E. Ritchie,
By his Attorneys,
Williamson & Merchant

No. 723,923. PATENTED MAR. 31, 1903.
E. E. RITCHIE.
VOTING MACHINE.
APPLICATION FILED JULY 5, 1902.
NO MODEL. 10 SHEETS—SHEET 8.
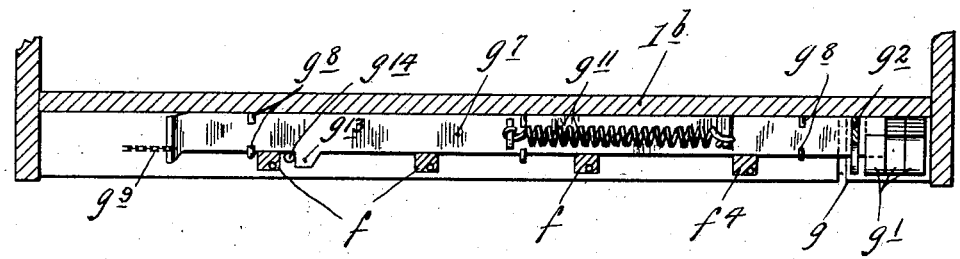
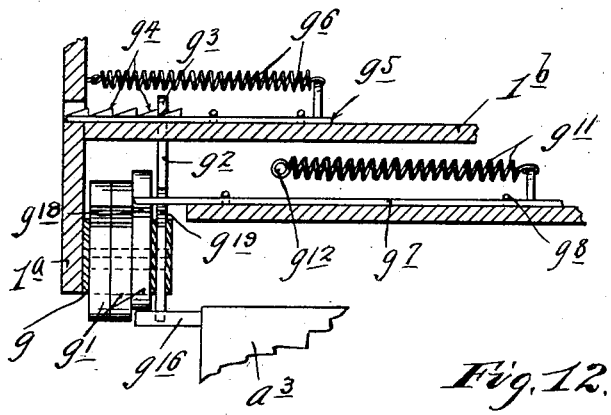
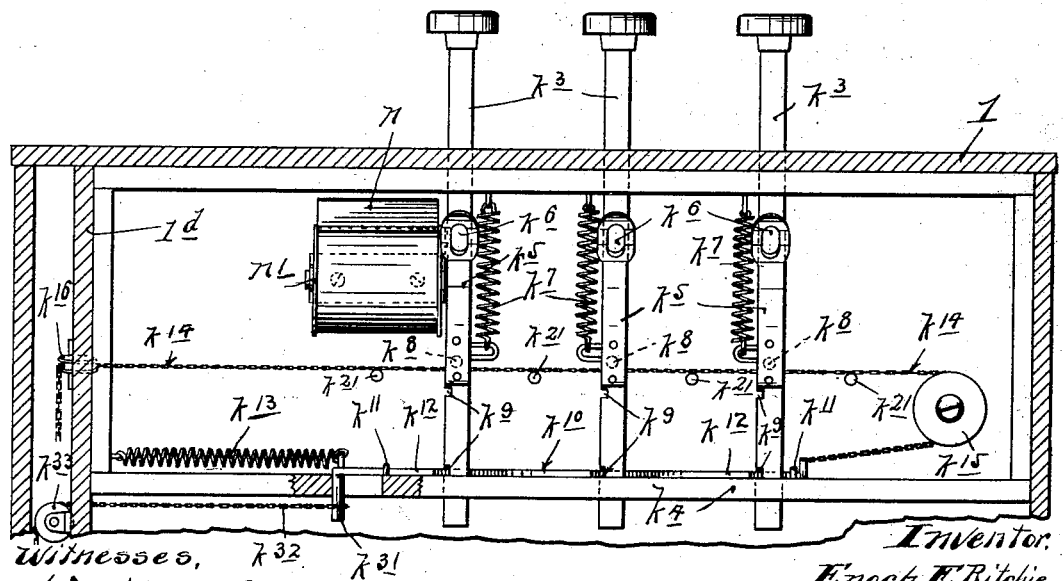

No. 723,923. PATENTED MAR. 31, 1903.
E. E. RITCHIE.
VOTING MACHINE.
APPLICATION FILED JULY 5, 1902.
NO MODEL. 10 SHEETS—SHEET 9.
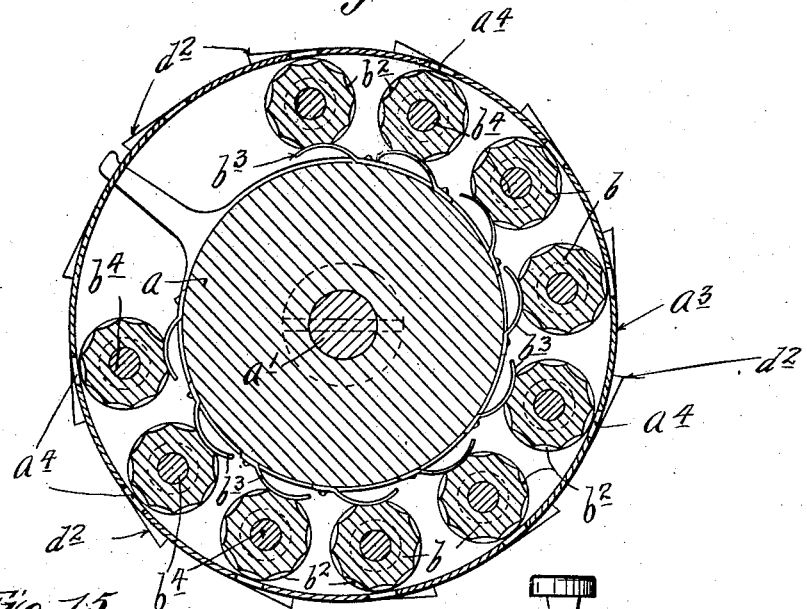
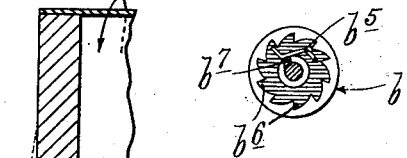
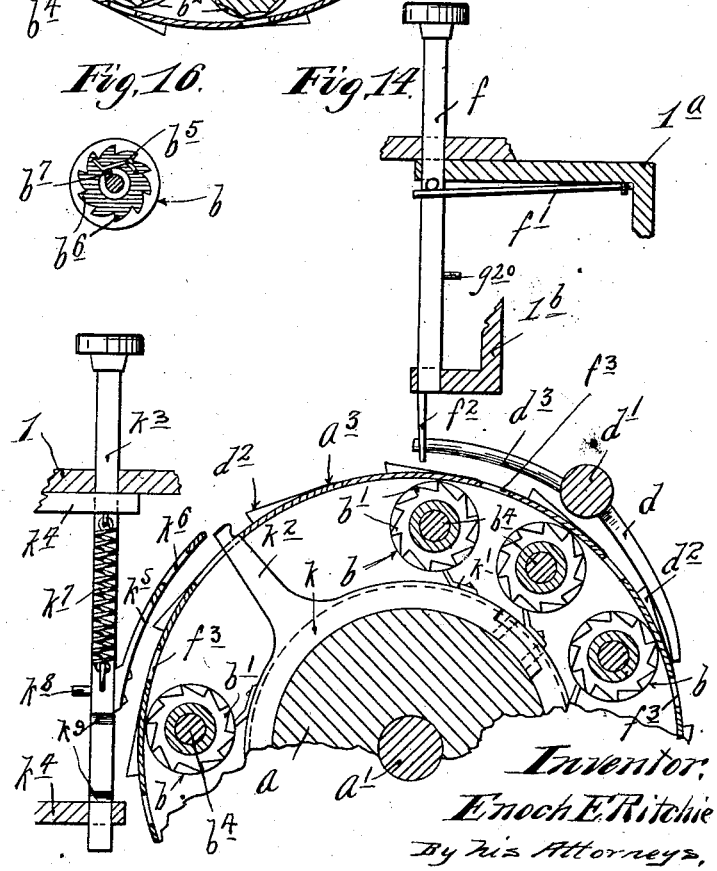
Witnesses.
H. D. Kilgore,
A. H. Opsahl.
Inventor:
Enoch E. Ritchie
By his Attorneys,
Williamson Merchant No. 723,923. PATENTED MAR. 31, 1903.
E. E. RITCHIE.
VOTING MACHINE.
APPLICATION FILED JULY 5, 1902.
NO MODEL. 10 SHEETS—SHEET 10.
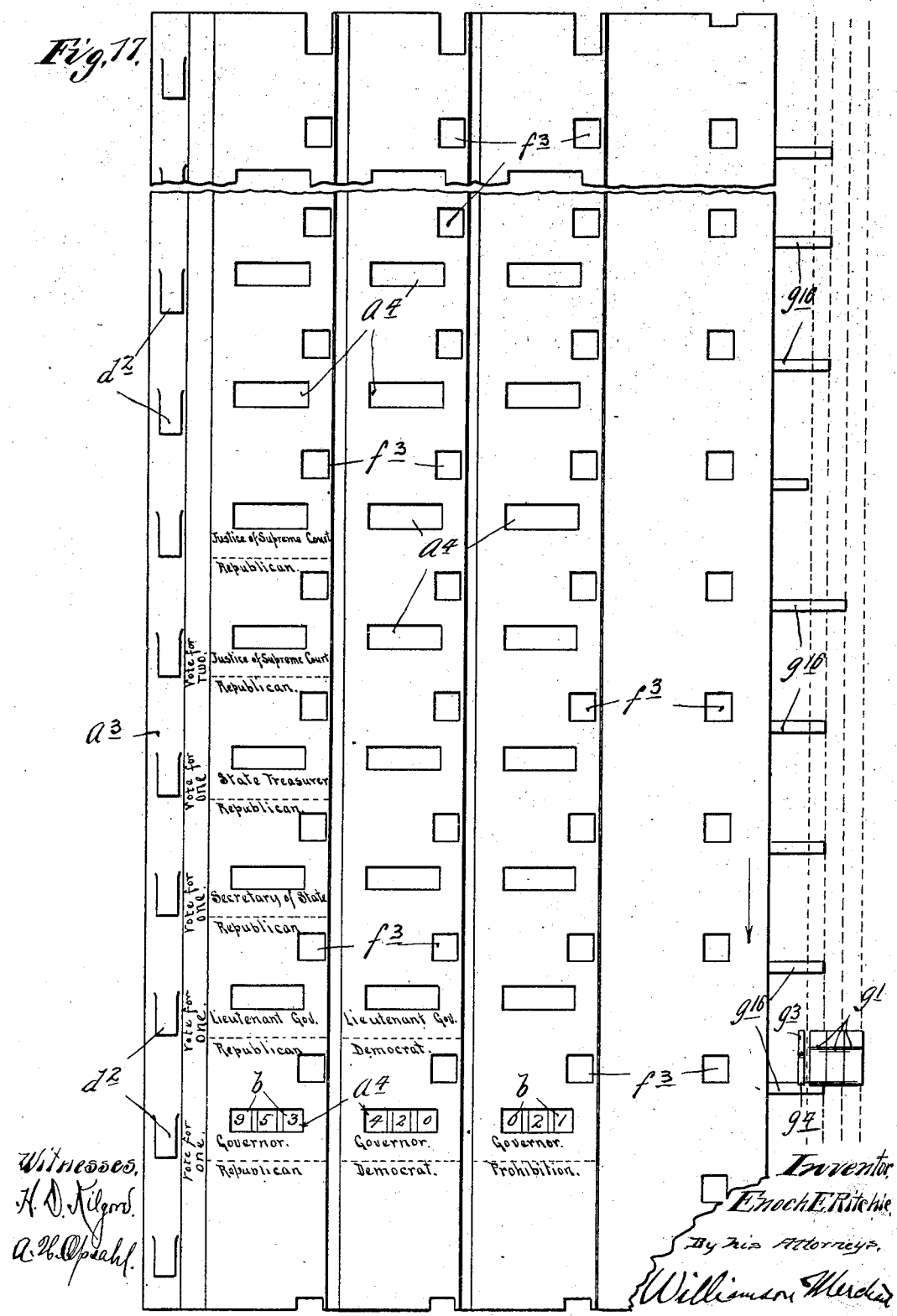

UNITED STATES PATENT OFFICE.

ENOCH E. RITCHIE, OF HOWARD LAKE, MINNESOTA.

VOTING-MACHINE.

SPECIFICATION forming part of Letters Patent No. 723,923, dated March 31, 1903.

Application filed July 5, 1902. Serial No. 114,368. (No model.)

*To all whom it may concern:*

Be it known that I, ENOCH E. RITCHIE, a citizen of the United States, residing at Howard Lake, in the county of Wright and State of Minnesota, have invented certain new and useful Improvements in Voting-Machines; and I do hereby declare the following to be a full, clear, and exact description of the invention, such as will enable others skilled in the art to which it appertains to make and use the same.

My invention has for its object to provide an improved voting-machine; and to this end it consists of the novel devices and combinations of devices hereinafter described, and defined in the claims.

The invention is illustrated in the accompanying drawings, wherein like characters indicate like parts throughout the several views.

Figure 1:
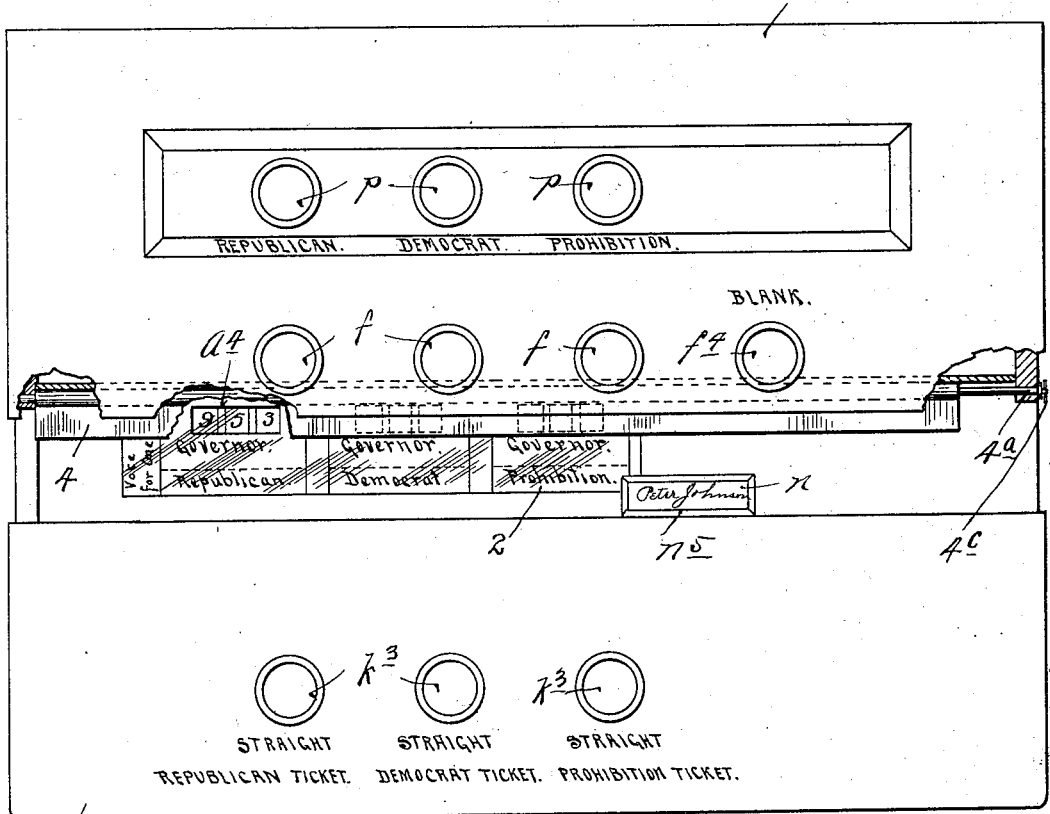
Figure 2:
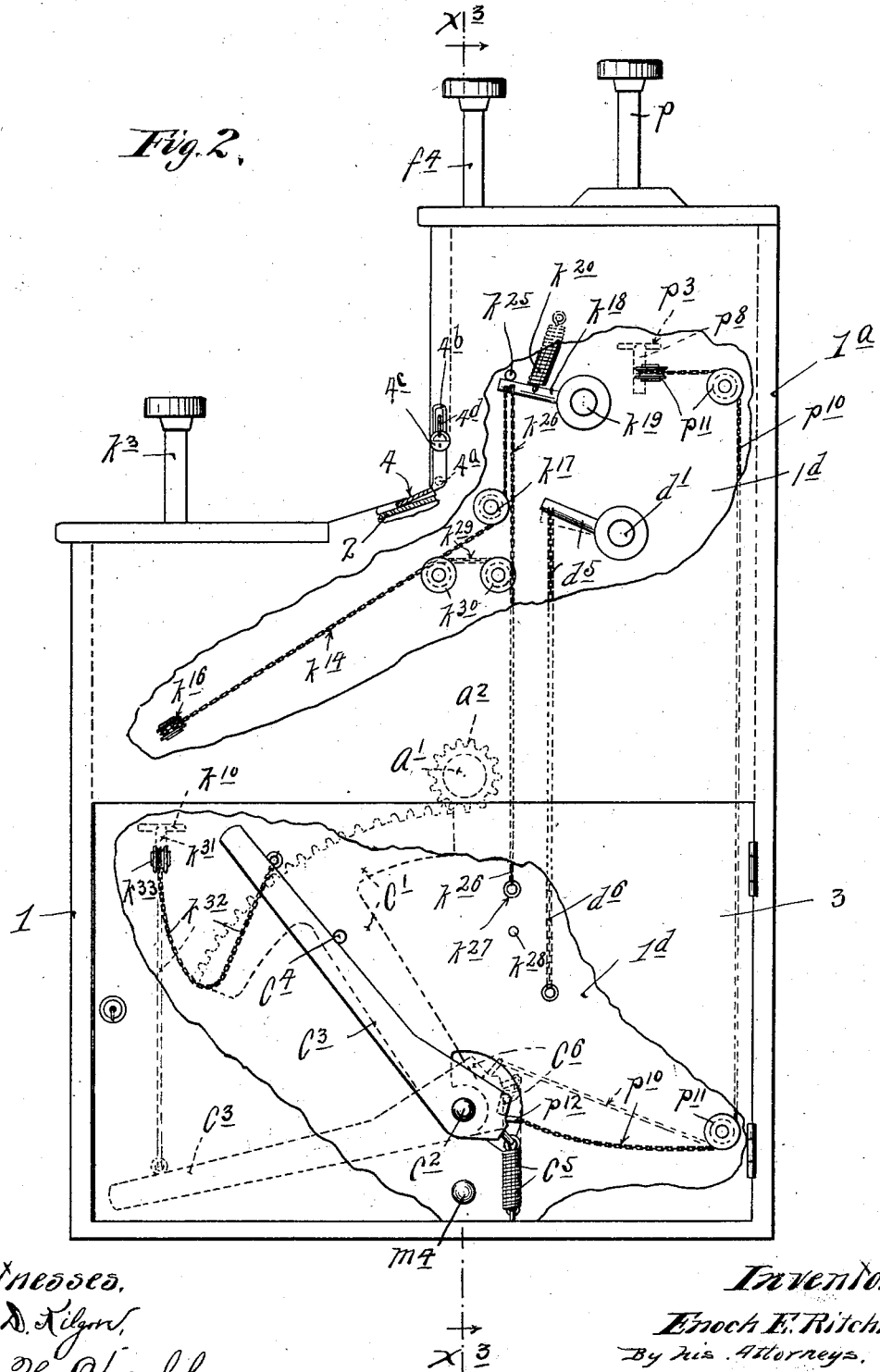
Figure 3:
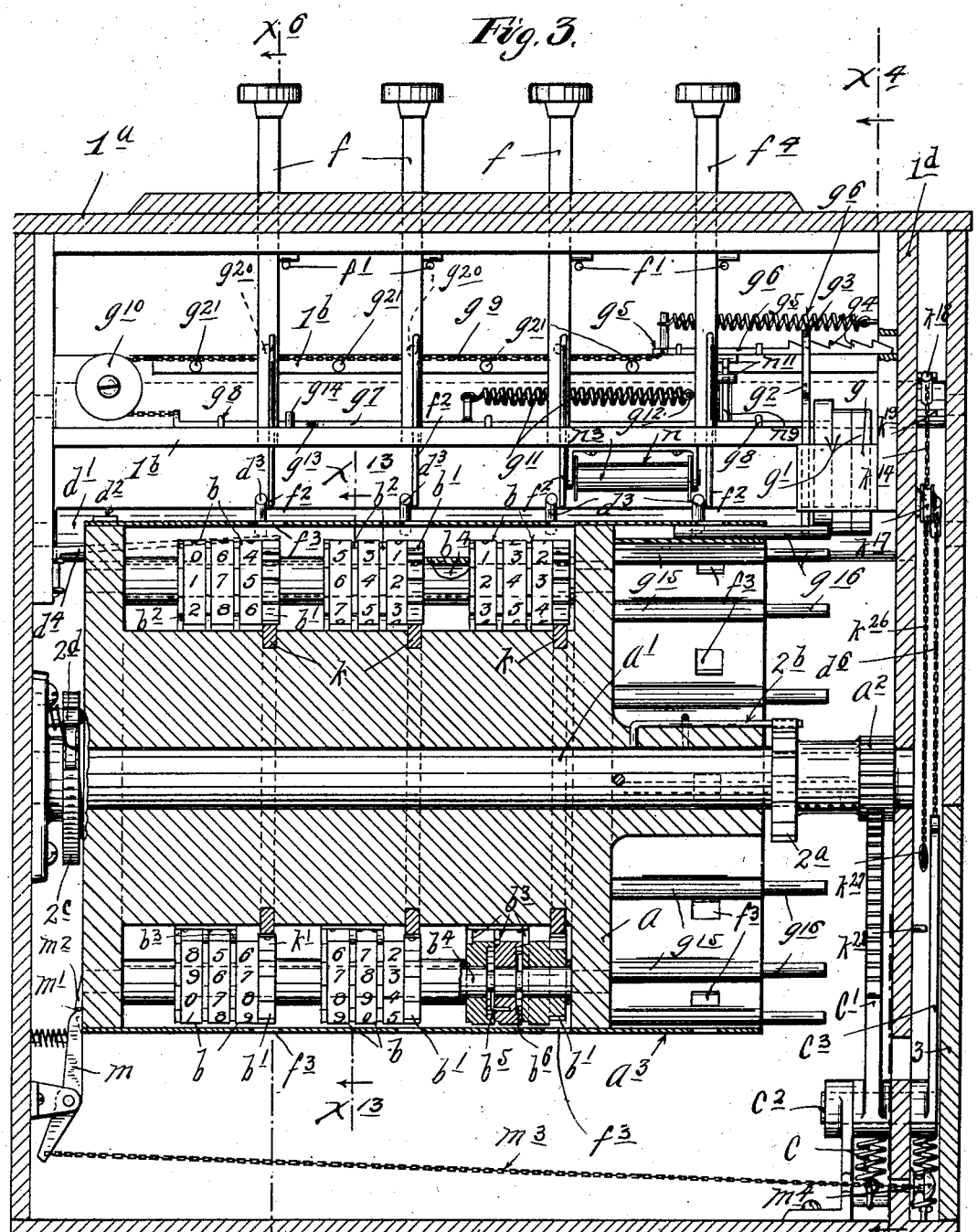
Figure 4:
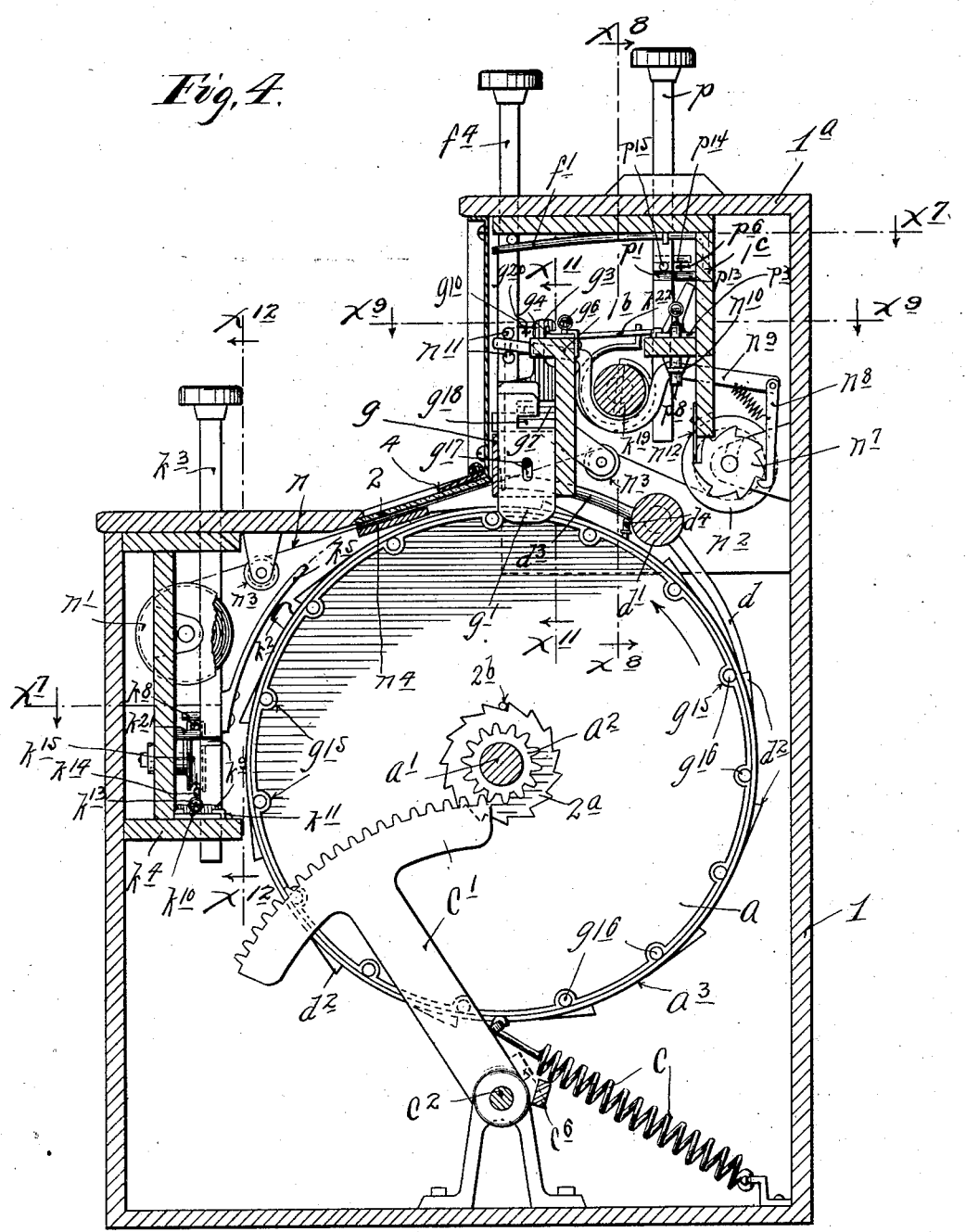
Figure 5:
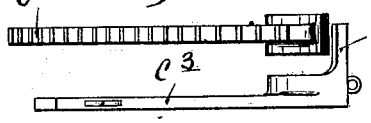
Figure 6:
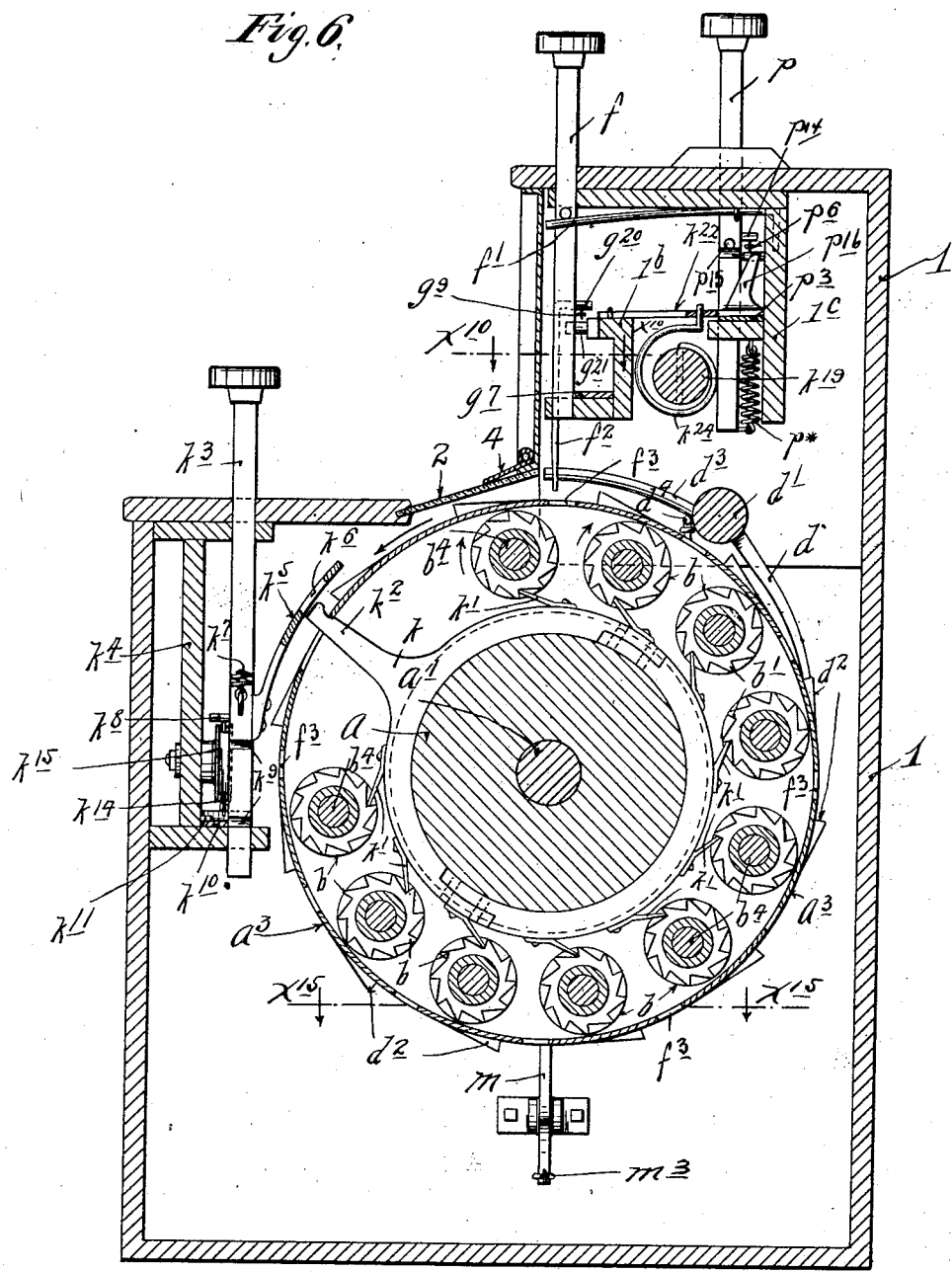
Figure 7:
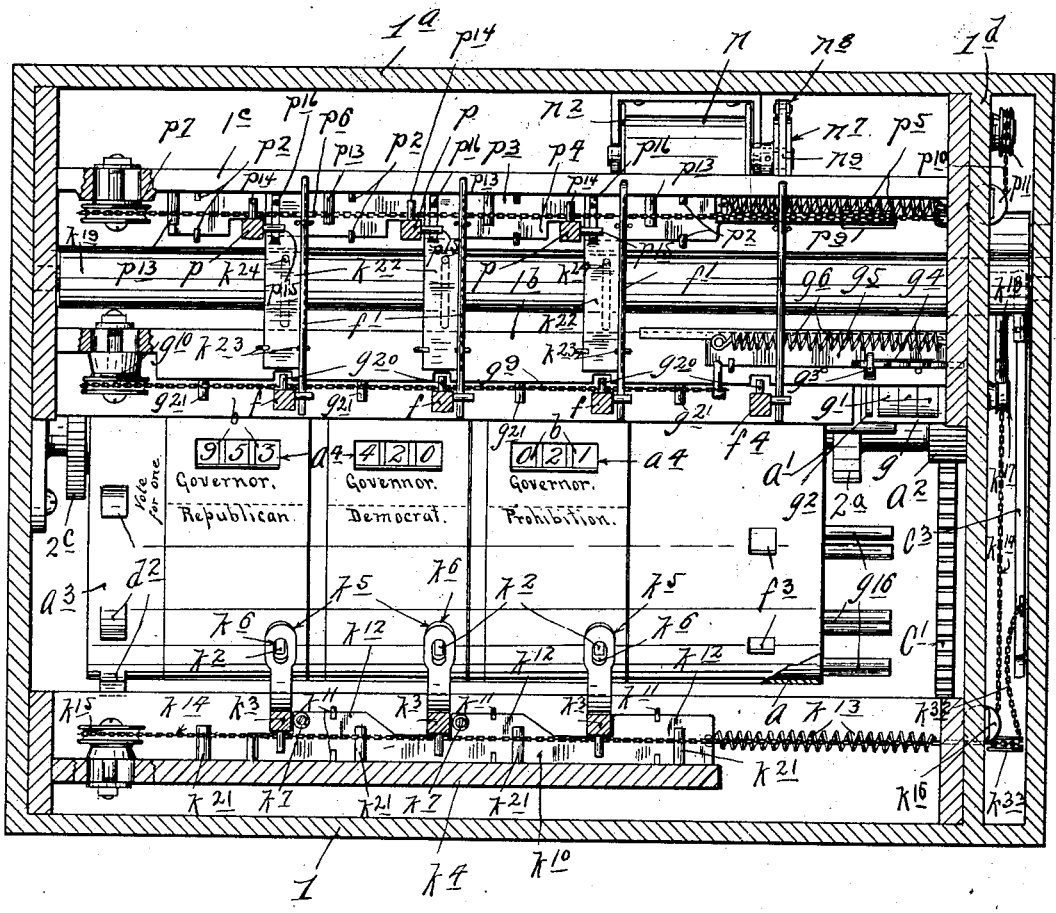
Figure 8:
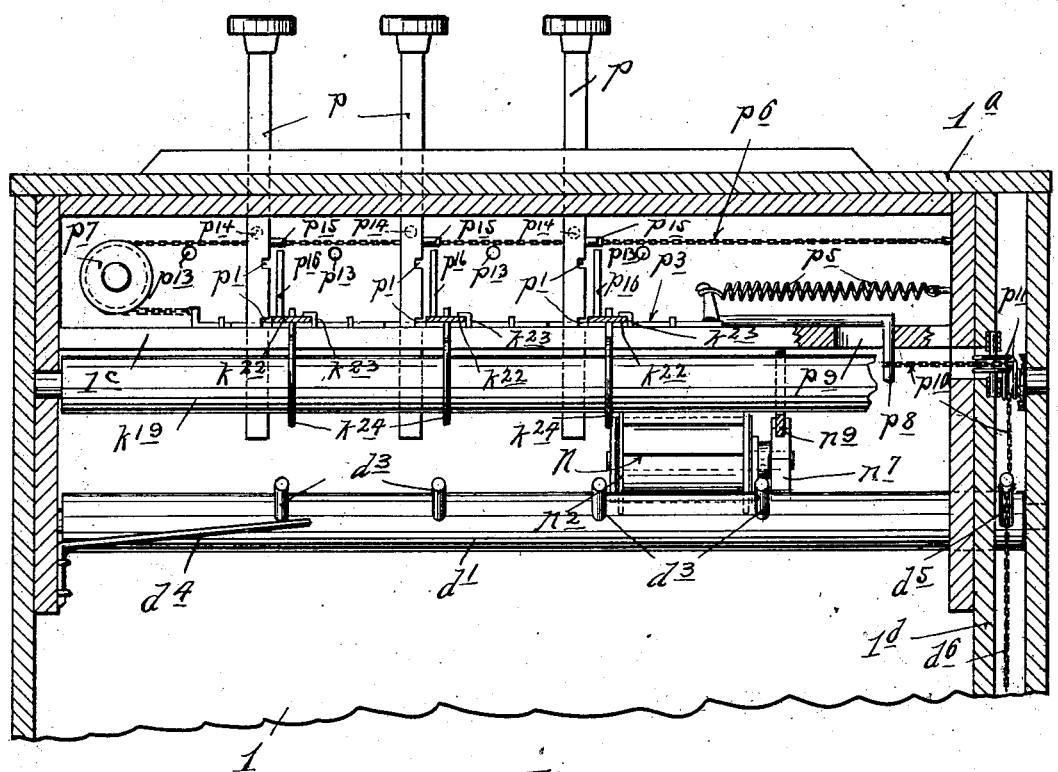
Figure 9:
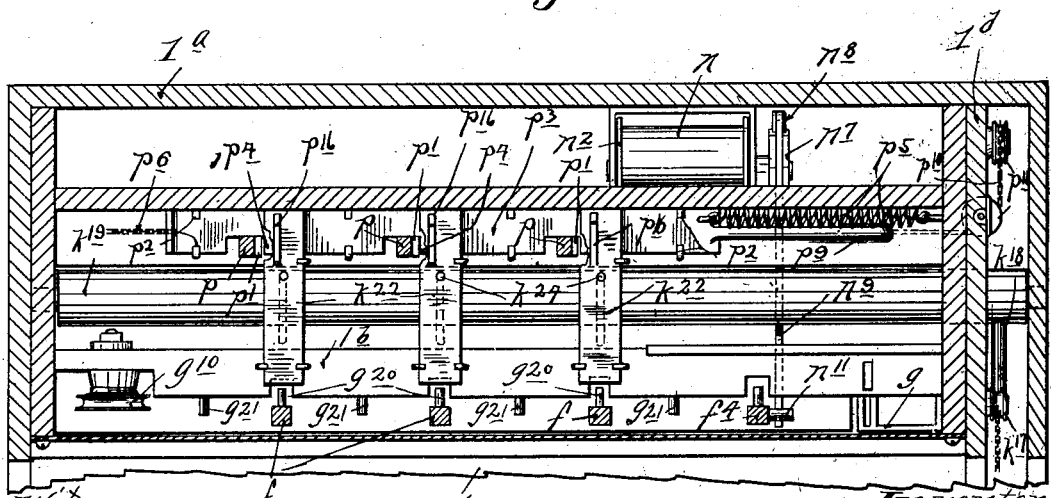

Figure 1 is a plan view of the complete voting-machine, some parts thereof being broken away. Fig. 2 is a side elevation of the machine with some parts broken away. Fig. 3 is a transverse vertical section taken approximately on the line $x^3 x^3$ of Fig. 2. Fig. 4 is a vertical section taken from front to rear of the machine on the line $x^4 x^4$ of Fig. 3. Fig. 5 is a detail in plan, showing the resetting-lever and coöperating segment. Fig. 6 is a vertical section taken from front to rear of the machine on the line $x^6 x^6$ of Fig. 3. Fig. 7 is a horizontal section on the irregular line $x^7 x^7$ of Fig. 4. Fig. 8 is a transverse vertical section taken approximately on the line $x^8 x^8$ of Fig. 4, some parts being broken away. Fig. 9 is a horizontal section on the line $x^9 x^9$ of Fig. 4, some parts being broken away. Fig. 10 is a detail in horizontal section on the line $x^{10} x^{10}$ of Fig. 6. Fig. 11 is a detail showing the mechanism at one side of the machine, partly in front elevation, but principally in vertical section, on the line $x^{11} x^{11}$ of Fig. 4. Fig. 12 is a vertical and transverse section taken on the line $x^{12} x^{12}$ of Fig. 4. Fig. 13 is a vertical section taken through the rotary drum and registers or tallies carried thereby on the line $x^{13} x^{13}$ of Fig. 3. Fig. 14 is a vertical section corresponding to Fig. 6, but with parts broken away and with the parts shown in different positions. Fig. 15 is a detail in horizontal section on the line $x^{15} x^{15}$ of Fig. 6, some parts being broken away and others removed, but showing the drum in a position corresponding to the position shown in Fig. 14. Fig. 16 is a detail of one of the wheels of the registers or tallies; and Fig. 17 is a diagram view showing a ticket laid out flat, which ticket will be secured to the periphery of the rotary drum, and showing also certain other parts in diagram.

The numeral 1 indicates a box-like case, shown as provided with a narrow transversely-extended section $1^a$, with a transversely-extended glass pane 2 at the base of the said section $1^a$, and provided at one side with the hinged door 3, which is adapted to be normally locked, but which when opened affords access to the interior mechanism of the machine.

The numeral 4 indicates a metal blade which is pivoted at $4^a$ to the case-section $1^a$ and is provided with an arm extension $4^b$, adapted to be secured by a padlock $4^c$ to a staple $4^d$ on the case-section $1^a$. As will hereinafter appear, this blade 4 when locked, as indicated, covers as much of the transparent pane 2 as is necessary to cut off the view of the tallies or registers.

The registers or tallies are all carried by a large rotary drum $a$, the shaft $a'$ of which is pivotally journaled in bearings on the sides of the case 1. At one end the shaft $a'$ has a loose pinion $a^2$, the hub of which carries a ratchet-wheel $2^a$, which coöperates with a spring driving-pin $2^b$, carried by the hub of the drum. At its other end the shaft $a'$ carries a ratchet-wheel $2^c$, which coöperates with a spring-pressed pawl $2^d$, mounted on the side of the case 1. The elements $2^c$ and $2^d$ prevent backward rotations of the drum $a$. This drum is recessed to receive the registers or tallies and is provided with a cylindrical peripheral shell $a^3$, which incloses the said tallies, but is provided with the sight-openings $a^4$, through which the readings of the tallies are exposed to view. As shown, each register involves three wheels $b$, located side by side, the primary members thereof having external ratchet-teeth $b'$ and all thereof being marked on their peripheries with the successive digits "0" to "9," inclusive. Each wheel $b$ is further provided with peripheral notches $b^2$, with which springs $b^3$ on the drum $a$ coöperate to yieldingly hold the said wheels against accidental movements, as best shown in Fig. 13.

The several tally-wheels are loosely mounted on transverse shafts $b^4$, rigidly secured to the drum $a$. The primary or first wheel $b$ of each tally and also the second member thereof are provided with spring-fingers $b^5$, the free ends of which are adapted to be engaged with ratchet-teeth $b^6$ of the second and third wheels, as shown in Fig. 16, whenever the said fingers are brought into engagement with fixed cam-lugs $b^7$ on the said shaft $b^4$. This engagement takes place once for each rotation of a given wheel, and when it takes place the wheel of higher order is given a one-tenth rotation, and thus the carrying of the tens is effected. It will, however, be understood, so far as my present invention is concerned, that the registers or tallies may take various forms.

In the drawings a very much smaller number of tallies is shown than would be required in an actual working machine designed for use at elections. However, the principle would be the same. Also the machine illustrated is designed to permit the representation of three political parties, assumed to be the Republican, Democratic, and Prohibition parties. The tallies or registers appropriate to a given party are extended in the same plane circumferentially around the drum, while the tallies which are appropriate to the different political parties, but to the same office, are located in axial line—to wit, on the same shaft $b^4$.

The normal position of the drum $a$ is indicated in Figs. 4 and 6, and, in fact, in all other views in which it is shown except in Figs. 14 and 15. The drum is put under strain to rotate in the direction indicated by the arrows marked on Figs. 4 and 6 from a quite heavy spring $c$, shown as attached to the bottom of the case 1 and to a segmental gear $c'$, the teeth of which mesh with the pinion $a^2$ of the drum-shaft $a'$.

To properly restrain the movements of the rotary drum $a$, there is provided an escapement-pawl $d$, carried by a rock-shaft $d'$, arranged to be oscillated as hereinafter described. This pawl $d$ coöperates with ratchet-teeth $d^2$, formed on the periphery of the drum $a$, preferably by stamping teeth-like projections from the cylindrical shell $a^3$ of said drum, as best shown in Figs. 4, 6, 13, 14, and 17. The rock-shaft $d'$, which carries the pawl $d$, is provided with a plurality of projecting pins or rods $d^3$ for a purpose which will presently appear, and against one of these a spring $d^4$ on the side of the case engages to yieldingly hold the pawl $d$ in an operative position.

Suitably mounted in the top $1^a$ of the case and within a suitable supporting bracket or shelf $1^b$, secured within said section $1^a$, are three vertically-movable keys $f$, yieldingly held upward by springs $f'$, as best shown in Figs. 6 and 14. At their lower ends these keys $f$ are provided with depending fingers $f^2$, which are adapted to work through perforations $f^3$ in the drum-shell $a^3$ and to engage directly with the ratchet-teeth $b'$ of the primary tally-wheels $b$ when the said keys are depressed to their limits, and thus to actuate the tally. When one of the keys $f$ is thus depressed, its shouldered lower end engages one of the pins $d^3$ of the rock-shaft $d'$, and thus rocks said shaft and raises the pawl $d$ out of engagement with the adjacent teeth $d^2$ of the rotary drum, and thus permits the said drum to rotate slightly—to wit, as far as permitted by the play between the depressed finger $f^2$ and engaged perforation $f^3$—such movement being sufficient, however, to carry the released tooth $d^2$ forward of the free end of the said pawl $d$, so that the proper step of movement may be imparted to the drum as soon as the depressed key is raised. In line with the three keys $f$, but at the right thereof as viewed in Figs. 1, 3, and 9, is a fourth key $f^4$ of substantially the same construction as the keys $f$ and likewise provided with a depending finger $f^2$, which works through certain of the perforations $f^3$, provided in the drum-shell $a^3$, below the same. This key $f^4$ is termed the "blank" key, since no tallies are provided for coöperation therewith. When it is depressed, however, its lower end engages one of the pins $d^3$ of the rock-shaft $d'$ and its finger $f^2$ enters one of the said perforations $f^3$, thereby producing the same escapement action and permitting the same step of movement to the drum as if one of the other keys $f$ had been depressed.

The device for limiting the number of votes which may be cast for the candidates for the particular office is best illustrated in Figs. 3, 4, 10, 11, and 17 and, as shown, comprises as follows: Loosely mounted with perfect freedom for limited vertical movements within a suitable keeper $g$ is a plurality (as shown, three) of counting-blocks or escapement-slides $g'$ and also an escapement-lock $g^2$, the latter of which is provided at its upper end with a detent $g^3$, which coöperates with the teeth $g^4$ of a ratchet-bar $g^5$, mounted to slide transversely on the upper flange of a supporting-shelf $1^b$ of the case-section $1^a$. The ratchet-rack $g^5$ is yieldingly drawn toward the right with respect to Fig. 3 and toward the left with respect to Fig. 11 by means of a coiled spring $g^6$.

For direct coöperation with the counting or limiting blocks or slides $g'$ a plunger or slide $g^7$ is mounted in suitable keepers $g^8$ on the lower flange of the supporting-shelf $1^b$. A chain or other non-elastic flexible connection $g^9$, which runs over a guide-sheave $g^{10}$ on the shelf $1^b$, connects the plunger $g^7$ and the ratchet-bar $g^5$ for reverse movements. A spring $g^{11}$, connected to said plunger $g^7$ and, as shown, to a pin $g^{12}$, projecting from the shelf $1^b$, yieldingly draws said plunger toward the right with respect to Figs. 3 and 10 and toward the left with respect to Fig.

11. The springs $g^6$ and $g^{11}$ always keep the chain $g^9$ taut; but said spring $g^{11}$ is strong enough to overcome the spring $g^6$ and move the ratchet-bar $g^5$ inward or from its normal position (indicated in Figs. 3 and 11) whenever said ratchet-bar is released. Normally, however, said ratchet-bar is locked in its normal position by the engagement with the teeth thereof of the detent $g^3$, carried at the upper end of the latch $g^2$. Furthermore, normally the counting or limiting blocks $g'$ are all dropped downward, and the outer end of the plunger or slide $g^7$ engages the inner face of the upper end of the innermost of said blocks and is thus further held against outer movement. The movement of the plunger $g^7$ toward the left with respect to Figs. 3 and 10 is limited by the engagement of a lug $g^{13}$ thereof with the stop-pin $g^{14}$ on the shelf $1^b$.

Adjustably mounted in keepers $g^{15}$ on the right-hand end of the drum as viewed in Figs. 3, 4, and 17 is a plurality of block-setting pins $g^{16}$. There is one of these pins $g^{16}$ for each series of axially-alined tallies or registers. These pins may be adjusted axially so that they will engage the lower end of the latch $g^2$ and one, two, or three of the counting-blocks $g'$. When one of these pins $g^{16}$ moves past and under one or more of the said blocks $g'$ and latch $g^2$, it will by action on the rounded or cam-shaped lower ends thereof (see Fig. 4) raise the same, such movements being permitted by slot-and-pin engagements $g^{17}$. Said blocks $g'$ are provided with notches $g^{18}$, which when said blocks are raised register with the outer end of the plunger or slide $g^7$ and permit the same under the action of the spring $g^{11}$ to move toward the right with respect to Fig. 3 a distance depending on whether one, two, or three of the said blocks have been raised.

The latch $g^2$ is provided with a notch $g^{19}$, which always clears the end of the plunger or slide $g^7$. It is evident from the foregoing statement that since the spring $g^{11}$ is stronger than the spring $g^6$ and since the latch $g^2$ is always raised whenever one or more of the counting-blocks $g'$ is raised that when the said plunger $g^7$ is moved toward the right with respect to Fig. 3 or toward the left with respect to Fig. 11 the ratchet-bar $g^5$ will be moved in a reverse direction or inward a distance measured in teeth $g^4$ equal to the number of blocks $g'$ which have been raised and then will be caught and held in such set position by the detent $g^3$ of the latch $g^2$.

As best shown in Figs. 3, 7, and 9, the three keys $f$ are provided each with a projecting pin or lug $g^{20}$, which directly overlies the upper portion of the chain $g^9$. The pins $g^{20}$ work between pins $g^{21}$, which project from the upper shelf or flange of the bearing-bracket $1^b$ and directly underlie the upper portion of the said chain $g^9$. The relation of these parts is such that when one of the keys $f$ is depressed to its limit it will draw on the chain $g^9$ and move the plunger or slide $g^7$ inward far enough to drop or release one of the counting-blocks $g'$, as will be hereinafter more fully described. By the mechanism so far described a so-called "mixed ticket" may be voted.

To enable the voting of the straight ticket, I provide the following mechanism, which is best illustrated in Figs. 6, 7, 12, and 14: Loosely mounted on the hub of the drum $a$ are three rings or collars $k$—to wit, one for each political party represented, and consequently one for each circumferentially-arranged series of tallies or registers. Each ring $k$ is provided with a plurality of spring-pawls $k'$, which engage one with the ratchet-teeth $b'$ of each tally of the corresponding circumferentially-arranged series, as best shown in Fig. 6. Each ring $k$ is further provided with a projecting arm $k^2$, which works through a suitable slot in the drum-shell $a^3$.

For coöperation with each ring $k$ is a straight-vote key $k^3$, which works vertically through a suitable support $k^4$, formed as part of the case 1, and is provided with a prong $k^5$, formed at its projecting end with a perforation $k^6$, which is adapted to receive the free end of the arm $k^2$ of the corresponding ring $k$. Each key $k^3$ is yieldingly held upward by a spring $k^7$ and is provided with the forwardly-projecting pin $k^8$ and with lateral notches $k^9$.

A lock slide or plate $k^{10}$ is mounted to move transversely of the case in keepers $k^{11}$ on the lower shelf of the support $k^4$. This lock-slide $k^{10}$ (see Figs. 7 and 12) is provided with shoulders or blade projections $k^{12}$, which normally stand out of engagement but in horizontal line with the lower notches $k^9$ of the keys $k^3$. The latch-slide $k^{10}$ is yieldingly held in its normal position (indicated in the drawings) by a spring $k^{13}$, connected to one end thereof and to the side of the case. A chain $k^{14}$ is connected to the other end of said lock-slide $k^{10}$ and extends from thence over a guide-sheave $k^{15}$ on the support $k^4$ and outward over a guide-sheave $k^{16}$ on one end of said support $k^4$, as best shown in Fig. 12. Said chain $k^{14}$ then passes over a guide-sheave $k^{17}$, secured within the case, and its upper end is attached to an arm $k^{18}$ of a rock-shaft $k^{19}$, as best shown in Fig. 2. The rock-shaft $k^{19}$ extends transversely through and is mounted in suitable bearings on the sides of the case-section $1^a$, and it is yieldingly held in its normal position by a spring $k^{20}$, shown as connected to its arm $k^{18}$ and to one side of the case.

The chain $k^{14}$ passes directly under the pins $k^8$ of the keys $k^3$ and directly over the pins $k^{21}$, which project inward from the face of the support $k^4$. As is evident, when one of the keys $k^3$ is depressed the chain $k^{14}$ will be put under tension and will be drawn in both directions. The exact action of this operation will be traced a little later on.

For coöperation with each of the three keys $f$ there is a lock-bolt $k^{22}$, which moves from front to rear of the machine in suitable keepers $k^{23}$ on the supporting-brackets $1^b$ $1^c$, as best shown in Figs. 6, 7, and 9. When one of these lock-bolts is moved forward, it engages directly under the pin $g^{20}$ of the corresponding key $f$ and locks the said key, so that it cannot be depressed or operated. To simultaneously throw forward the several lock-bolts $k^{22}$, they are connected to the rock-shaft $k^{19}$ by means of spiral spring-fingers $k^{24}$, the spring features of which fingers are important when used in connection with mechanism hereinafter described for adapting the machine for use at primary elections.

By reference to Fig. 2 it will be noted that the spring $k^{20}$ normally holds the arm $k^{18}$ of the rock-shaft $k^{19}$, which actuates the lock-bolts $k^{22}$, against a stop $k^{25}$ on the side of the case 1. A chain or flexible connection $k^{26}$, attached at its upper end to the arm $k^{18}$, is provided at its lower end with a ring $k^{27}$, which when the connection is drawn downward is engageable with a pin $k^{28}$, which projects from an inside vertical wall or partition $1^d$ of the case 1. The intermediate portion of the connection $k^{26}$ is connected to the intermediate portion of the chain or connection $k^{14}$ by means of a short chain-section $k^{29}$, which runs over suitable guide-sheaves $k^{30}$, mounted on the vertical partition $1^d$. The purpose of these connections will later appear. Pivoted on the shaft $c^2$, which affords a pivot also for the segmental gear $c'$, is a resetting-arm $c^3$, which works between the partition $1^b$ and the case-door 3. This resetting-arm $c^3$ is normally held against a stop $c^4$ by a spring $c^5$, and it is provided with a laterally-projecting finger $c^6$, (see Figs. 2, 4, and 5,) which when the parts are thrown in the dotted-line positions, as shown in Fig. 2, engages the arm of the said segmental gear $c'$ and forces the same back to its normal position against the tension of the spring $c$, under which movement the ratchet-wheel $2^a$ slips under the spring finger or pawl $2^b$, the drum $a$ being held against return movement by the retaining device $2^c$ $2^d$. The free end of the resetting-arm $c^3$ is connected to one end of the slide $k^{10}$, preferably to a depending finger $k^{31}$ thereof, by means of a chain or flexible connection $k^{32}$, which preferably runs over a guide-sheave $k^{33}$, mounted within the case 1. This connection $k^{32}$ has such slack that it will draw upon the slide $k^{10}$ only when the resetting-arm $c^3$ is moved to its extreme downward position. (Indicated by dotted lines in Fig. 2.)

The pawl-actuating rock-shaft $d'$ is provided between the partition $1^d$ and the adjacent side of the case with an arm $d^5$, to which a depending chain or flexible connection $d^6$ is attached for a purpose which will presently appear.

By reference to Figs. 3, 14, and 15 it will be noted that the drum has not quite reached or returned to its normal position, but stands in such position that the arm $k^2$ of the straight-vote register-actuating ring $k$ will not be engaged by the prong $k^5$ of a coöperating straight-vote actuating-key. It will also be noted that in this position no one of the voting-keys $f$ can be depressed or the corresponding registers actuated thereby. To positively stop the drum whenever it reaches this extreme position, I provide a lock, preferably comprising a spring-pressed lock-dog $m$, suitably pivoted within the case 1 and coöperating with the notch $m'$ of the cam-flange $m^2$, carried by the adjacent end of the drum. In view of this lock the drum can never be reset by the voter or started on its second rotation.

To enable the judge or attendant after opening up the door 3 to release the lock-dog $m$, a chain or other connection $m^3$ is attached to said dog and extended through the perforation in the partition $1^d$ and provided at its outer end with a knob or finger-piece $m^4$.

The following is a summary of the operation of the mechanism so far described. By an inspection of Fig. 17 it will be noted that all of those block-setting pins $g^{16}$ which are connected with the transversely-extended series or groups of tallies appropriated to an office to which but one of several candidates may be elected are projected to such an extent that they will engage and lift upward only one—to wit, the inner one—of the three blocks or slides $g'$. On the other hand, it will also be noted that the particular pin $g^{16}$ which is used in connection with the longitudinally-extended series or group of tallies which is appropriated to an office to which, say, two candidates may be elected—such, for instance, as justice of the supreme court—is projected far enough to engage and raise the inner two of the said blocks or slides $g'$. It will be further noted by reference to Fig. 17 that two longitudinally-extended rows or series of tallies are appropriated to justices of the supreme court and that it is the forward member of the coöperating pins $g^{16}$ that is projected as just above noted, while the second pin is pushed inward so far that it will have no action whatever on the counting blocks or slides $g'$.

We will first assume that the voter while the parts of the machine are in normal positions, as indicated in all of the views except Figs. 14 and 15, wishes to vote a mixed ticket. We will further assume that the first series or transversely-extended group of registers or tallies is appropriated to governor. The voter first depresses the particular one of the keys $f$ which is appropriated to the particular political party upon whose ticket the particular candidate for governor for whom he wishes to vote is represented. The depression of this key registers a vote for the particular candidate. It also by engagement with the coöperating finger $d^3$ rocks the shaft $d'$, raises the escapement-pawl $d$, and permits the engaged tooth $d^2$ of the drum to move forward of the free end of said pawl, so that as soon as the said key is released and permitted to again rise the first step or feed movement of the drum will take place and the next series of tallies—for instance, those appropriated to the several candidates for lieutenant-governor—will be brought to operative position. As is evident, it makes no difference which one of the three keys $f$ is depressed, except as to the particular tally which will be actuated. The feed movements of the drum in either case will be as above described. It will be remembered and will be further noted by again referring to Fig. 17 that the particular slide-setting pin $g^{16}$ which corresponds to a particular group of tallies is set in advance, so that it will lift up and set the proper number of escapement-slides $g'$ before the said tallies are brought to operative positions. If, for instance, but one slide or block $g'$—to wit, the inner one—be raised or set, then the slide $g^7$ and ratchet-bar $g^5$ under the action of the spring $g^{11}$ and against the tension of the spring $g^6$ will be set in the positions indicated in Fig. 11. Attention is here called to the fact that the escapement-lock $g^2$ is raised at the same time that one or more of the escapement blocks or slides $g'$ are raised, so that the ratchet-bar $g^5$ is at such times released from the detent $g^3$. With the said parts set, as shown in Fig. 11 when one of the keys $f$ is depressed its pin $g^{20}$, acting on the upper section of the chain $g^9$, will buckle the same over the coöperating pair of pins $g^{21}$, and as the ratchet-bar $g^5$ is held against inward movement by the escapement-lock $g^2$ the slide $g^7$ will be drawn inward against the spring $g^{11}$ far enough to drop the raised or set escapement block or slide $g'$. The escapement slide or block thus dropped then again becomes a base of reaction to prevent outward movement of the slide $g^7$ under the action of its spring $g^{11}$, when the depressed key $f$ is again raised. Then as the chain $g^9$ is left with slack the spring $g^6$ becomes operative to move the slide $g^5$ outward one tooth in distance. The slack is thus taken up and the ratchet-bar $g^5$ is locked in its new position, which in the action just described is its normal position. When the slide $g^7$ is moved inward to its normal position, (best shown in Figs. 3 and 10,) its stop-lug $g^{13}$ engages a stop $g^{14}$, as previously described. Hence when the said slide $g^7$ reaches this position and the ratchet-bar $g^5$ is locked in its outer position the chain or connection $g^9$ is held taut, so that no one of the keys $f$ can be depressed far enough to actuate the tally or register.

The action where several votes are to be cast for two or more candidates to the same office, such as justices of the supreme court, will be very much as above described. If the two candidates happen to be found in the same series of tallies or registers, then the two or more votes may be simultaneously cast by simultaneously depressing two or more of the keys $f$. If the said candidates happen to be found in different series or groups of tallies, one in advance of the other, then they must be voted successively. Of course the number of escapement-slides or counting-blocks $g'$ which are raised will determine the number of votes which will be permitted for a given office. The raising of the given number of slides requires the taking up of a given amount of slack in the chain $g^9$, and it matters not whether this slack be taken up simultaneously by depressing a number of keys at once or by depressing the same number of keys in succession. When the predetermined amount of slack is taken up in either way, the several keys $f$ are locked by the chain $g^9$.

After the voter has cast all of the votes to which he is entitled he cannot further manipulate the machine. If, however, at any time he wishes to skip certain candidates or not to cast a vote for a particular office, he may do so by depressing the blank-key $f^4$, the depression of which does not actuate a tally, but nevertheless causes a feed movement of the drum.

If instead of voting a mixed ticket the voter wishes to vote a straight ticket, he may do so by depressing the selected one of the three straight-vote keys $k^3$. The depression of one of these keys while the parts stand in the normal position (indicated in Fig. 6) causes the perforation $k^6$ of the key-prong $k^5$ to engage the end of the arm $k^2$ of the ring $k$, and thereby oscillate said ring and simultaneously record votes for the candidates for the several offices represented on the particular political ticket.

The depression of a straight-vote key $k^3$ not only locks the other straight-vote keys in their normal positions, but also locks all of the individual-voting keys $f$ in their normal positions. This action takes place as follows: The pin $k^8$ of the depressed key $k^3$ bends the chain $k^{14}$ over the coöperating pins $k^{21}$ and draws upon the same from both ends. It first rocks the rock-shaft $k^{19}$ and through the spring-fingers $k^{24}$ moves the lock-bolts $k^{22}$ forward under the pins $g^{20}$ of the keys $f$, and thereby locks said keys $f$ into normal positions. Then having taken up the play in the chain $k^{14}$ it draws the slide $k^{10}$ against its spring $k^{13}$ and forces the shoulders $k^{12}$ thereof into the alined notches $k^9$ of the said keys $k^3$. This latter engagement cannot take place, however, until the depressed key $k^3$ reaches its extreme lowermost position, in which position its upper notch $k^9$ is brought into the plane of the latch-slide $k^{10}$.

The machine may be reset by the judge or attendant in the following manner: The door 3 is of course first opened. Then by pulling on the chain or connection $d^6$ the shaft $d'$ is rocked and the escapement-pawl $d$ is released from the escapement-teeth $d^2$, so as to insure the movement of the drum to the position indicated in Figs. 14 and 15. Then to reset the spring $c$ and return the segmental gear $c'$ to normal position the resetting-arm $c^3$ is moved downward into its dotted-line position, as shown in Fig. 2, at the limit of which movement the chain $k^{32}$ is drawn upon, thereby drawing the latch-slide $k^{10}$ toward the left with respect to Fig. 12, so as to release the straight-vote keys $k^3$ and permit the depressed member thereof to return to normal position. The return of the depressed straight-vote key gives slack to the chain $k^{14}$ and permits the spring $k^{20}$ to become active to rock the shaft $k^{19}$ and throw the lock-bolts $k^{22}$ back to their normal positions. Then to cause the final return step of movement of the drum to normal position the attendant takes hold of the finger-knob $m^4$ of the connection $m^3$ and releases the lock-dog $m$.

As is a well-known fact, it is necessary to provide a voting-machine with means whereby independent votes—that is, votes for persons not represented on any of the tickets—may be cast for any political office represented. The name of the independent candidate is adapted to be written on a paper ribbon $n$, which is wound from a spool $n'$ and on to a spool $n^2$, both of which spools are suitably mounted within the case 1. The ribbon $n$ passes over guide-sheaves $n^3$, over a platen or shelf $n^4$, and under an opening $n^5$ in a glass plate 2, which parts are suitably supported by the case 1. The names of the candidates on the several tickets are placed circumferentially on the exterior of the drum. The opening $n^5$ permits the point of a pencil to be applied to the ribbon $n$ just above the platen $n^4$.

It is of course necessary that the ribbon $n$ be given a step-by-step feed movement—to wit, one step of feed movement each time the so-called "blank-key" $f^4$ is depressed. Hence the receiving-spool $n^2$ is provided with a ratchet-wheel $n^7$, with which a spring-pressed pawl $n^8$ coöperates. Said pawl $n^8$ is carried by the rear end of a lever $n^9$, pivoted at $n^{10}$ and connected at its forward end to the said key $f^4$ by a pair of pins $n^{11}$ or otherwise.

$n^{12}$ indicates a retaining pawl or spring which prevents return movements of the receiving-spool $n^2$.

The machine as above described is adapted for use at general elections, where provision must be made for the voting of a mixed ticket.

By an additional device now to be described I adapt the machine for use at primary elections, where it is necessary that the voter first select a political party and having selected such vote only for candidates for nomination represented on that party-ticket. First of all this primary election involves keys corresponding in number to the number of keys $f$—to wit, as shown, three. These primary-election keys $p$ are suitably mounted for movement through the top of the case 1 and through the shelf $1^c$, and, like the straight-vote keys, they are provided with upper and lower lock-notches $p'$. Mounted to slide horizontally in keepers $p^2$ on the shelf $1^c$ is a locking blade or slide $p^3$, provided with lock-shoulders $p^4$, which coöperate with the notches $p'$ of the keys $p$ very much in the same way in which the previously-described latch-slide $k^{10}$ coöperates with the notches $k^9$ of the straight-vote keys $k^3$. A spring $p^5$, anchored at one end to the side of the case and connected at its other end to the end of the slide $p^4$, yieldingly draws said slide toward the right with respect to Figs. 7 and 8. A chain or other inelastic flexible connection $p^6$, anchored to the case 1 at one end, is passed over the guide-sheave $p^7$ and connected to the left-hand end of the slide $p^4$. The slide $p^3$ is provided at its right-hand end with a depending stop-finger $p^8$, which works through a slot $p^9$ in the shelf $1^c$. A chain $p^{10}$ is connected to the stop-finger $p^8$ and passed over suitable guide-sheaves $p^{11}$ on the vertical partition $1^d$ of the case. The lower end of the chain $p^{10}$ is attached to a short stud or pin $p^{12}$, carried by the resetting-lever $c^3$. The upper portion of the chain $p^6$ passes over pins or studs $p^{13}$, which project in pairs from the back of the bracket $1^e$ for coöperation with pins $p^{14}$, carried by the keys $p$ and overlying the chain $p^6$. The keys $p$ are further provided with cam-actuating pins $p^{15}$, which when the keys are depressed engage cam-lugs $p^{16}$, carried by the lock-plungers $k^{22}$, as best shown in Figs. 6, 8, and 9. The operation of this primary-election device, briefly summarized, is as follows: To set the machine for a primary election, the door 3 is opened and the chain $k^{26}$ is drawn downward and its ring $k^{27}$ attached to the pin $k^{28}$. This downward movement of said chain $k^{26}$, as already indicated, not only rocks the rock-shaft $k^{29}$, forces forward all of the lock-plungers $k^{22}$, and locks all of the keys $f$, but also by drawing on the chains $k^{14}$ and $k^{29}$ moves the latch-slide $k^{10}$ and locks all of the straight-vote keys $k^3$ in inoperative positions. The voter then selects his party by depressing one of the keys $p$. When one of the keys $p$ is depressed, its cam-actuating pin $p^{15}$ engages with the cam-lug $p^{16}$ of the corresponding lock-bolt $k^{22}$ and forces the same rearward against the tension of its spring $k^{25}$, and thus releases the corresponding individual-vote-recording key $f$. The key $f$, which is thus released, is the only key which may thereafter be operated by the voter, and it of course may be used to vote successively for the selected candidates for nomination represented on the selected party-ticket. The depression of one of the keys $p$ throws its pin $p^{14}$ downward against the chain $p^6$ and buckles the same downward over the coöperating pins $p^{13}$, thereby taking up all of the slack of the said chain and, moreover, putting the same under considerable tension, so that as soon as the upper notch $p'$ of the depressed key reaches the horizontal plane of the lock plate or slide $p^4$ the shoulders of said slide will be drawn thereinto and into the lower notches of the other two keys $p$, thereby locking all three of said keys, the depressed member in its operative position and the other two keys in their inoperative position. The three keys $p$ will remain locked, as above indicated, until the resetting-lever $c^3$ is moved to its dotted-line position, (indicated in Fig. 2,) at the extreme limit of which movement the chain $p^{10}$ will be drawn upon, thereby drawing the lock-slide $p^4$ toward the right with respect to Figs. 8 and 9, thus releasing the depressed key $p$ and relieving the chain $p^6$ from strain.

From the description given it is thought that the operation of the machine in its several uses has been made clear.

It will of course be understood that the machine above described is capable of a great many modifications within the scope of my invention as herein set forth and claimed.

What I claim, and desire to secure by Letters Patent of the United States, is as follows:

1. In a voting-machine, the combination with a rotary drum carrying several series of laterally-spaced circumferentially-disposed tallies, of a local tally-actuating key for each circumferentially-arranged series of tallies, and escapement mechanism actuated by said keys and controlling the movements of the drum, substantially as described.

2. The combination with a rotary drum carrying several series of laterally-spaced and circumferentially-disposed tallies, of a tally-actuating key for each circumferential series of tallies, working through perforations in said drum, which perforations permit initial movements of said drum, and an escapement actuated by the depression of any of said keys, to cause an initial movement of the drum and when the key is released to limit the step of movement of the drum, substantially as described.

3. The combination with the rotary drum carrying several series of laterally-spaced and circumferentially-disposed tallies, an individual-vote key coöperating with each circumferentially-arranged series of tallies, an escapement device for the drum actuated by said key-oscillating tally-actuators operating on all of the tallies of the given circumferential series, and straight-vote keys, one for each oscillating tally-actuator, having connections for action thereon to record straight votes, which straight-vote devices are rendered inoperative by the first movement of the drum $k$, under the action of the individual-vote keys, and which individual-vote keys are rendered inoperative whenever one of the straight-vote keys is operated, substantially as described.

4. The combination with a rotary drum carrying a circumferentially-disposed series of tallies, of an individual tally-actuating key working through perforations in said drum, which perforations permit initial movements of said drum, an escapement for said drum actuated by said key, an oscillating ring mounted on said drum and provided with pawls or elements which operate on the several tallies of the series, an arm projecting from said ring to the exterior of said drum, a straight-vote key operating on the arm of said ring, only when the drum is in normal position, and connections whereby, when the said straight-vote key is operated, the individual-vote key is rendered inoperative, substantially as described.

5. The combination with a drum rotatable always in a constant direction, of an escapement controlling the movements of said drum, several laterally-spaced circumferentially-disposed tallies carried by said drum, an individual-vote key for action on each series of tallies, any of which when depressed, actuate said escapement, a plurality of vote limiting or counting blocks arranged to be set under movements of the drum, and a lock mechanism for said keys controlled by said blocks and limiting the number of votes which may be cast by the manipulation of the said keys, substantially as described.

6. The combination with a rotary drum carrying several laterally-spaced series of circumferentially-disposed tallies, an individual-vote-recording key operating on the tallies of each series, an escapement for the drum actuated by the depression of any of said keys, a plurality of vote-limiting blocks adapted to be set by projections carried by the said drum, and a locking device for said keys comprising a slide spring-pressed against said blocks, and a flexible inelastic connection which when drawn taut, locks the said keys, substantially as described.

7. The combination with a rotary drum carrying several series of laterally-spaced circumferentially-disposed tallies, of tally-actuating keys $f$ having projections $g^{20}$, an escapement for the drum actuated by said keys, a plurality of vote-limiting blocks $g'$, the block-setting pins or projections $g^{16}$ carried by the drum, the latch $g^2$ also subject to said pins $g^{16}$, the spring-pressed slides $g^7$ yieldingly pressed against said blocks $g'$, the spring-pressed ratchet-bar $g^5$ with which said latch-plate $g^2$ coöperates, and the chain or similar connection $g^9$ connecting said slides $g^7$ and ratchet-bar $g^5$ and passed over guide-sheaves $g^{10}$ and fixed pin or projections $g^{21}$, the said parts operating substantially as described.

8. The combination with a rotary drum carrying several series of laterally-spaced circumferentially-disposed tallies, of an escapement device for controlling a step-by-step movement of the drum, an individual-vote key for action on the tallies of each series, any of which keys when depressed, actuate said escapement, a blank key having no action on said tallies but acting on said escapement, substantially as described.

9. The combination with a continuously-located drum carrying several series of laterally-spaced circumferentially-disposed tallies, of an escapement controlling the step-by-step movements of the drum, an individual-vote key for action on said series of tallies, the depression of any of which keys actuate said escapement, and a lock for stopping the movements of the said drum before it has quite reached its normal or starting position and which lock is protected so that it cannot be operated by the voter, substantially as described.

10. In a voting-machine, the combination with a rotary drum carrying several series of laterally-spaced circumferentially-disposed tallies, of an escapement for said drum, an individual-vote key for action on the tallies of each series and for operating said escapement, a lock-bolt for each of said keys, a bolt-actuating member connected to the several lock-bolts, by yielding elements, a corresponding number of primary-election keys having connections for releasing any of said lock-bolts, and means for limiting to one, the number of said latter keys which may be operated, and hence, the number of individual-vote keys which may be released and rendered operative, substantially as described.

11. The combination with a rotary drum carrying several series of laterally-spaced circumferentially-disposed tallies, of a primary individual-vote key for action on the tallies of each series, a drum-escapement actuated by said keys, a corresponding number of primary-election keys having cam-actuating pins or shoulders $p^{15}$, the corresponding lock-bolts $k^{22}$ having cam-lugs $p^{16}$, the rock-shaft $k^{19}$ independently connected to said lock-bolts $k^{22}$ by spring-fingers $k^{24}$, which lock-bolts when thrown forward, lock said keys $f$, and which bolts may be released by depressing one of said keys $p$, and means for limiting to one, the number of keys $p$ which may be depressed and, consequently, the number of keys $f$ which may be released and rendered operative, substantially as described.

12. In a voting-machine, the combination with individual-vote keys and tallies actuated thereby, of an independent-vote key, a ribbon or paper strip movable past the point where names may be written thereon, and a pawl-and-ratchet device for moving said ribbon actuated by said independent-vote key, substantially as described.

13. The combination with a rotary drum and an escapement for controlling the movements thereof, individual-vote keys and an independent-vote key all acting on said escapement, and a ribbon or paper strip movable under the action of said independent-vote key past a point where names may be written thereon, substantially as described.

14. The combination with a drum and an escapement controlling the movements thereof, of individual-vote keys and an independent-vote key all operating on said escapement, a ribbon or paper strip movable past a point where names may be written thereon, and a pawl-and-ratchet device subject to said independent-vote key and operating to impart a step-by-step movement to said ribbon or strip, substantially as described.

In testimony whereof I affix my signature in presence of two witnesses.

ENOCH E. RITCHIE.

Witnesses:
F. E. LATHAM,
J. P. AMANTRUST.